[54] HEAT WELDED JOINTS BETWEEN WEBS OF REINFORCED PLASTIC FOIL

[75] Inventor: Erik Wilhelm Wallin, Gamleby, Sweden

[73] Assignee: Barracudaverken Aktiebolag, Djursholm, Sweden

[22] Filed: Jan. 3, 1974

[21] Appl. No.: 430,406

[30] Foreign Application Priority Data

Jan. 3, 1973 Sweden .............................. 7300082

[52] U.S. Cl. .................................. 428/61; 428/99; 428/104; 428/121; 156/71; 156/92; 52/222

[51] Int. Cl.² ...................... B32B 3/04; B32B 7/08; E04F 13/00

[58] Field of Search ............... 2/87, 2.1 R, 82, 275; 161/46, 50; 428/77, 99, 102, 104, 57, 61, 121; 156/91–93, 71, 304; 52/63, 222, 291, 528; 160/327–328; 135/15 CF, 33 R

[56] References Cited

UNITED STATES PATENTS

| | | | |
|---|---|---|---|
| 1,560,712 | 11/1925 | Naylor | 161/50 |
| 2,031,098 | 2/1936 | Cerf et al. | 161/50 X |
| 2,115,368 | 4/1938 | Lustberg | 161/50 |
| 2,624,886 | 1/1953 | Herman | 161/50 |
| 2,683,679 | 7/1954 | Hurd et al. | 428/57 |
| 2,974,566 | 3/1961 | Hurley | 156/92 X |
| 3,199,481 | 8/1965 | Handwerker | 161/50 X |
| 3,420,731 | 1/1969 | Kuhn | 428/104 X |
| 3,424,161 | 1/1969 | Scheier | 161/50 X |
| 3,441,467 | 4/1969 | Odell | 428/121 |
| 3,459,149 | 8/1969 | Hallmark | 161/50 X |
| 3,615,966 | 10/1971 | Ljungbo | 52/222 X |

Primary Examiner—Philip Dier
Attorney, Agent, or Firm—Toren, McGeady and Stanger

[57] ABSTRACT

The invention refers to heat weld joints of the type used for adjoining webs of reinforced plastic foil intended for use as stretched ceiling covers. The invention consists in the provision of means at intervals along the heat weld joints for reinforcing same to withstand the influence of heat. The invention also covers a process for the preparation of such reinforced heat weld joints.

8 Claims, 2 Drawing Figures

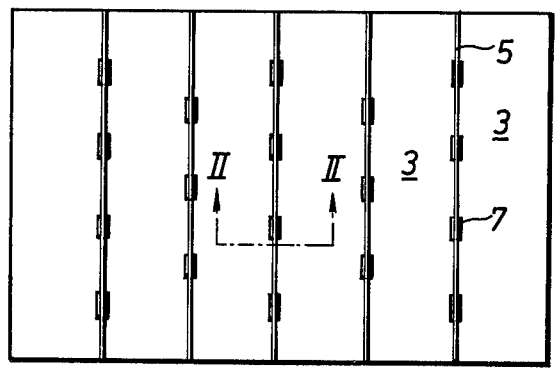
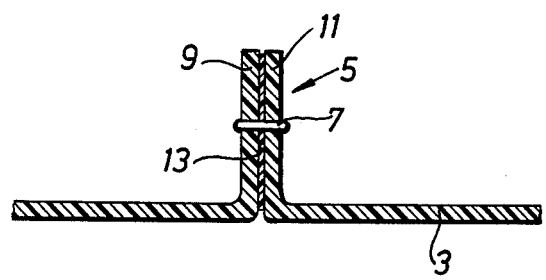

HEAT WELDED JOINTS BETWEEN WEBS OF REINFORCED PLASTIC FOIL

The present invention refers to improvements in heat weld joints between webs of reinforced plastic foil intended for use as stretched ceiling covers. The invention also refers to a process for providing such joints.

In recent years ceiling cover structures of plastic foil have reached a progressively increased use. The advantage of such plastic foil ceiling cover is mainly that it obviates time-consuming and expensive polishing of coarse concrete surfaces of cast concrete vaults according to previously used technique. However, it has been found that hitherto known ceiling cover structures made from reinforced plastic foil by joining several parallel webs by means of heat welding are subject to certain disadvantages. In case of fire, resulting in heating of the ceiling cover, it has namely been found that if the temperature increases to much too high values, the heat weld joints between the plastic foil webs may break so that the webs will depend from the ceiling to a significant extent. This may in turn result in panicking in connection with evacuation of the building wherein fire has arisen. The inconvenience is particularly pronounced when using such reinforced plastic foil wherein the reinforcement consists of a material subject to heat shrinkage. When a ceiling cover structure based on such plastic foil is subjected to heating this results in stresses in the heat weld joints, whereby said joints break to an essential extent resulting in the inconveniences indicated above.

In connection with the present invention it has now been found that the above disadvantages can be eliminated by an arrangement consisting in means provided at intervals along the heat weld joints for reinforcing the joint by mechanical binding of the reinforcement material. Such reinforcing means, which are preferably arranged at essentially equal intervals, can consist of a stitching or a thread seam made with heat resistant thread or of any form of rivets or clips. It is particularly advantageous to arrange the reinforcing means in adjacent joints displaced or staggered, i.e. in zigzag, whereby the points or areas of reinforcement are subjected to the lowest possible stress. This is particularly desirable when using such reinforced plastic foils, wherein the reinforcement consists of a material subject to heat shrinkage. It is particularly preferred to use reinforcing means consisting in a stitching or a thread seam, and in this connection it has been found to be particularly suitable to use a thread seam extending in the longitudinal direction of the heat weld joint and covering about one fourth of the length of the joint.

The invention also refers to a process for providing the reinforcement arrangement, and this process consists in arranging reinforcing means along the heat weld joint at essentially equally spaced intervals.

In the following the invention will be described by example of a particularly preferred embodiment in connection with the appended drawing. It should, however, be observed that the invention in no way shall be construed as delimited to the embodiment shown. In the drawing, FIG. 1 shows in a plan view from above a ceiling cover in accordance with the invention, whereas FIG. 2 shows an enlarged section taken along the line II—II in FIG. 1.

FIG. 1 of the drawing thus shows in a plan view seen from above a ceiling cover consisting of a reinforced plastic foil stretched between four walls. In the embodiment shown in FIG. 1 the ceiling cover structure consists of six parallel webs 3 of such reinforced plastic foil, the webs being joined by heat welding in five heat weld joints 5 in a conventional manner. As is clear from the detail section in FIG. 2 the webs 3 are joined in connection to upwardly bent edge parts 9, 11, which have been pressed together while heating to the formation of a zone 13 of molten plastics, by means of which the edge parts 9, 11 are held together. The ceiling cover may be stretched in a frame of track ribs attached to the walls, for instance in conformity with the technique described in the Swedish Pat. spec. No. 323,189 (which is incorporated herein by reference). However, the way of stretching and attachment of no part of the present invention and it may be carried out in any suitable manner.

The heat weld joints 5 holding webs 3 of plastic foil together are, in accordance with the present invention, supplemented with reinforcing means 7, said means in the embodiment shown consisting of thread stitchings positioned in the longitudinal direction of the heat weld joints 5 and at spaced regular intervals along said joints. As is clear from the plan view of FIG. 1 the places of reinforcement are positioned displaced or in zigzag, i.e. mutually displaced in the heat weld joints 5 in such a manner that each thread stitching 7 of one heat weld joint is positioned about equally spaced between the thread stitchings 7 of the adjacent heat weld joint.

As introductorily stated, in case of fire, problems may arise in connection with using a ceiling cover in the form of stretched reinforced plastic foil. Particularly when using a reinforcement material subject to heat shrinkage great stresses will be created in the ceiling cover in case of fire, which results in breaking of the heat weld joints, whereby the plastic foil webs wholly or partly are disengaged and will depend from the ceiling in large pieces. By the arrangement according to the present invention consisting in the provision of reinforcements along the heat weld joints this inconvenience is avoided. By the arrangement shown in FIG. 1 of the drawing consisting in displacement of the reinforcing areas a maximum of relief of the stresses is provided in the cases where the reinforcement consists of a material subject to heat shrinkage.

The reinforced plastic foil may advantageously consist of plasticized polyvinyl chloride foil reinforced with a structural fabric of polyamide fibers. The preferred embodiment as regards the reinforcing means consisting in thread stitchings may advantageously be provided by means of a thread consisting of polyamide fiber. At a web width of about 150 cm it has been found to be particularly suitable to use a stitching length of about 20 cm and a distance between the places of stitching of about 80 cm. Quite generally, the distance between the places of reinforcement should lie within the range of about 0.3 - 0.8 times the web width.

The invention is not delimited to the embodiment described above. Thus, the reinforcing means may consist of other elements, such as plastic or metal rivets, metal clips and the like. Neither is the invention delimited to the use of such reinforced plastic foil consisting of polyvinyl chloride reinforced with polyamide fibers. Thus, the polyvinyl chloride may be replaced by any polyvinyl polymer, olefin polymer or urethane elastomer. As concerns the reinforcing material the only requirement, in addition to the heat resistance, is that in the form it is present in the plastics it shall possess a certain elasticity, i.e. a yielding characteristic, making it suitable for stretching to form a ceiling cover. The reinforcing material may consist of synthetic fibers, for instance based on polyamides or polyesters, or mixed fibers based on synthetic fibers together with other fibers in a minor amount, for instance cotton. It is also conceivable to make the reinforcing material from glass fibers.

What is claimed is:

1. A cover comprising at least two elongated webs of reinforced plastic foils for use as a stretched ceiling cover with each web having edges extending in the elongated direction of the web and with the surfaces of said webs disposed in generally planar relationship and the elongated edges of said webs disposed in parallel relation, wherein the improvement comprises that the elongated edges of said webs being bent out of the plane of said webs and extending angularly outwardly from the plane of said webs, adjacent said elongated edges on adjacent webs being disposed in contacting relationship and heat welded together along their lengths forming a heat welded joint therebetween, means extending through the outwardly bent portions of said elongated edges of said webs forming the heat welded joint for securing the outwardly bent portions together, and said means positioned at spaced intervals along the length of the joint for reinforcing the joint.

2. A cover, as set forth in claim 1, wherein the reinforcing means being arranged at equally spaced intervals along the length of the heat welded joint.

3. A cover, as set forth in claim 1, wherein the cover comprises at least three said elongated webs of reinforced plastic foils, and said reinforcing means in adjacent heat welded joints being staggered relative to one another in the length direction of said joints.

4. A cover, as set forth in claim 1, wherein said reinforced plastic foils include a reinforcing structure fabric of polyamide fibers subject to heat shrinkage.

5. A cover, as set forth in claim 3, wherein the spaced interval between adjacent reinforcing means along the length of said heat welded joints is 0.3–0.8 times the dimension of the web extending transversely of the length of the heat welded joint.

6. A cover, as set forth in claim 3, wherein said reinforcing means consists of a thread stitched through the portions of adjacent elongated edges of said webs forming the heat welded joint.

7. A cover, as set forth in claim 6, wherein the spaced intervals of said stitched thread reinforcing means extending along the length of said heat welded joint occupies about one-fourth of the length of the joint.

8. A cover, as set forth in claim 6, wherein said reinforcing means extending through said heat welded joint are located intermediate the planar surfaces and the elongated edges of said webs.

* * * * *